Patented Sept. 29, 1953

2,653,965

UNITED STATES PATENT OFFICE 2,653,965

PRODUCTION OF ACRYLONITRILE

Robert M. Thomas, Niagara Falls, N. Y., assignor to Mathieson Chemical Corporation, a corporation of Virginia No Drawing. Application July 21, 1951, Serial No. 238,003

2 Claims. (Cl. 260—465.3)

My invention relates to the manufacture of acrylonitrile by the addition reaction of acetylene and hydrogen cyanide and more particularly relates to improvements in the catalytic mixed phase reaction in which the reactants are introduced into a mixture of catalytic materials in the liquid phase.

In the manufacture of acrylonitrile using liquid phase catalysts, cuprous chloride has been used as the principal catalyst. However, because of its very limited solubility in water, suitable catalyst solutions are prepared by the addition of ammonium chloride or alkali metal chlorides to the cuprous salt. Due perhaps to the formation of double compounds, for example $NH_4CuCl_2$, large proportions of cuprous chloride may thus be dissolved. Usually 1 mole of ammonium or alkali metal chlorides has been used per mole of cuprous chloride. Particularly advantageous results have been described using mixtures of sodium and potassium chlorides to make up the alkali metal chloride component, for example, 0.8 mole of potassium chloride and 0.2 mole of sodium chloride per mole of cuprous chloride. In general these mixed halide catalysts have been prepared in water and solutions of about 65–68% total solids are preferred.

The reaction is usually carried out at temperatures of 80°–90° C. An excess of acetylene compared to hydrogen cyanide is preferred and proportions of from 5 to 10 moles of acetylene per mole of hydrogen cyanide have been recommended. The velocity of introduction of hydrogen cyanide is important and a rate of, for example, 1 part by weight of hydrogen cyanide per 40–50 parts of cuprous chloride per hour has been recommended. At higher rates the hydrogen cyanide is incompletely converted and hydrogen cyanide appears in the product. Furthermore, an excess of hydrogen cyanide accelerates deterioration of the catalyst with respect to acrylonitrile formation and causes it to produce more acetaldehyde.

Under the best conditions previously described for the operation of this process the primary product from the reaction typically comprises the following:

Table I

| Component | Percent |
|---|---|
| Acrylonitrile | 80 |
| Acetaldehyde | 7 |
| Hydrogen Cyanide | 2 |
| Lactonitrile | 2 |
| Vinylacetylenes (mono and di) | 3 |
| Water, etc | 6 |
| Total | 100 |

The crude total product presents a difficult purification problem partly because of the nature of the components and their proportions but also especially due to the primary use of acrylonitrile in polymerization and copolymerization which requires an extremely pure monomer. Simple fractionation of the mixture cannot be employed because vinylacetylene and acrylonitrile differ in boiling points by only a few degrees and because lactonitrile, boiling higher than acrylonitrile, tends to decompose into HCN and acetaldehyde which contaminate the product.

I have discovered that if the reaction of acetylene and hydrogen cyanide is carried out in a catalyst solution of critically higher concentration in terms of solids contact while maintaining the proportion of cuprous chloride in the catalyst solution in excess of the other halide components that surprising improvements in yield and product distribution are developed. Previous investigators have taught that the optimum catalyst concentration from the standpoint of both yield and mechanical convenience in handling the materials of reaction is about 65 to 68%. I have found however that a eutectic exists in the system of mixed cuprous chloride and alkali metal chlorides at about 70 to 72% concentration of the mixed salts. By operating at all times during the reaction at a concentration on the high side of this eutectic, I have found that a significant increase in yield and improvement in product distribution can be obtained. I have operated without mechanical difficulty in handling the catalyst during the reaction or in conducting the reaction with concentrations on the high side of the eutectic of from greater than 70% to as high as 78%. For example, when a mixture of 0.8 mole of potassium chloride and 0.2 mole of sodium chloride per 1.03 to 1.10 moles of cuprous chloride is made into a slurry containing 26 to 28% water and 72 to 74% of the mixed salts, a clear solution containing 72 to 74% of the mixed salts is obtained on heating the mixture to above 45 to 50° C. Since this is well below the desired operating temperature of 80° to 90° C., there is little danger of solidification of the catalyst solution provided reasonable care is taken.

Previous investigators also have taught that an excess of cuprous chloride in the catalyst composition leads to the formation of larger proportions of divinyl acetylene as a contaminant of the product. I have found however that less divinyl acetylene is formed when excess cuprous chloride is used provided the concentration of the catalyst is increased to the high side of the eutectic, i. e. at least about 72 to 74% solids. Moreover, I have found that an excess of cuprous chloride in the catalyst composition results in a decrease in the proportion of acetaldehyde found in the product. I have found that the concentration of cuprous chloride should approximate at least about 1.03 to about 1.10 moles of cuprous chloride per mole of alkali metal halides. Bismuth and/or arsenic compounds may advantageously replace part of the cuprous chloride in the catalyst composition as described in U. S. Patent 2,476,771.

Hence by the seemingly small combination of changes produced by shifting the concentration of solids content of the catalyst to the critical high side of the eutectic range and by increasing the molar ratio of cuprous chloride to alkali metal halides to be in excess of equimolar, a significant and entirely disproportionate increase in conversion and yield and improvement in product distribution are obtained. Where previous investigators have produced maximum conversions based on hydrogen cyanide of up to about 80%, I usually obtain conversions averaging 5% higher in the range of 85 to 90% and have obtained conversions exceeding 90%. Where previous investigators have found side production of acetaldehyde and vinylacetylenes to average about 10% and side production of lactonitrile to average about 2% under best conditions, operation under the conditions of my invention results in a crude product which is sufficiently free of these impurities to permit purification to polymerization grade acrylonitrile by simple fractional distillation. For example, the typical composition of crude product produced by operation according to my invention in comparison to the composition set out in Table I representing averaged runs under the best conditions of conventional operation is as follows:

Table II

| Component | Percent |
| --- | --- |
| Acrylonitrile | 87 |
| Acetaldehyde | 0.4 |
| Hydrogen cyanide | 0.5 |
| Lactonitrile | 0 |
| Vinylacetylenes (mono and di) | 2.1 |
| Water | 10 |
| Total | 100.0 |

The crude product is substantially free of acetaldehyde and lactonitrile and thus can be fractionated directly. For example, the azeotrope of acrylonitrile and water containing 13% of the latter may be distilled overhead from the crude mixture. On cooling, the bulk of the water separates and leaves an acrylonitrile layer containing about 3% of water which may be dried by means of known drying agents or preferably by redistillation.

My invention will be further illustrated in the following illustrative examples.

*Example I*

A catalyst solution was made by charging to a heated reaction pot 0.8 mole of potassium chloride, 0.2 mole of sodium chloride, 1.075 moles of cuprous chloride (CuCl) and 3.2 moles of water. The resulting mixture containing 76% of salts and 24% of water was treated with hydrazine to remove cupric copper and maintained at 80° C. while acetylene alone was passed into the catalyst solution for 5 to 10 minutes prior to beginning the flow of hydrogen cyanide. The hydrogen cyanide inlet was arranged downstream from the acetylene inlet to insure an excess of the latter at all times. The hydrogen cyanide was introduced at the rate of 0.166 mole per hour per kilogram of catalyst solution and the acetylene at about six to eight times this rate.

The exit gases were passed through a series of condensers, the first cooled with water ice to remove the bulk of the water and the principal product was collected from condensers cooled with liquid ammonia. Several runs were carried out under these conditions with the results shown in the following table:

| Expt. No. | Product Composition, percent | | | | | |
| --- | --- | --- | --- | --- | --- | --- |
|  | Acrylonitrile | Acetaldehyde | Hydrogen Cyanide | Vinylacetylenes | $H_2O$ | $H_2O$ Etc. |
| 1 | 92 | 0.2 | 0.1 | 4 |  | 3.7 |
| 2 | 88 | 0.3 | 0.8 | 2.5 |  | 8.4 |
| 3 | 83 | 0.6 |  | 0.5 |  | 15.9 |
| 4 | 84 | 0.4 |  | 0.5 |  | 15.1 |
| 5 | 86 | 0.5 | 0.7 | 3.0 |  | 9.8 |
| Average | 87 | 0.4 | 0.5 | 2.1 |  | 10 |
| Average of Runs at 65–68% catalyst concentration | 80 | 7 | 2 | 3 |  | 8.0 |

The average results show distinct improvements over the previously obtainable values in increased yields of acrylonitrile and decreased proportions of other contaminants including acetaldehyde, hydrogen cyanide and vinylacetylenes.

*Example II*

The procedure of Example I was repeated except that the catalyst consisted of 0.8 mole of potassium chloride, 0.2 mole of sodium chloride, 1.035 moles of cuprous chloride, 0.04 mole of bismuth chloride and 3.2 moles of water. The product consisted of 92% acrylonitrile, 0.5% acetaldehyde, 0.2% HCN, 1.0% of vinylacetylenes and 6.2% of water, etc.

In operation according to my invention I have found that it is advantageous to keep the catalyst in continuous use to avoid deterioration. Thus on starting up after a period of shutdown the conversion invariably seems to be less than before. Since cupric copper is known to deleteriously affect the reaction of acetylene and hydrogen cyanide to produce acrylonitrile, copper powder or other forms of copper are sometimes incorporated into the catalyst system in contact with the solution. The incorporation of elemental copper in contact with the solution, particularly in the form of copper powder, however is mechanically disadvantageous. I have found that previously described difficulties due to the formation of cupric copper in the catalyst solution can be avoided by using reagents free from air, particularly when hydrazine is used as a reducing agent to insure the absence of cupric copper in the freshly prepared catalyst solution.

I claim:

1. In the manufacture of acrylonitrile by reaction of acetylene and hydrogen cyanide at about 80° to 90° C. in the presence of a liquid phase catalyst comprising a mixture of cuprous chloride and alkali metal chlorides and recovery of acrylonitrile from the crude product by fractionation, the improvement which comprises reacting the acetylene and hydrogen cyanide in contact with an aqueous cuprous chloride catalyst solution which contains a concentration of total salts on the high side of the eutectic composition of at least 70 to 72% total salts and which contains at least about 1.03 moles to about 1.10 moles of cuprous chloride per mole of alkali metal chlorides.

2. The improvement of claim 1 in which the molar proportion of alkali metal chloride comprises about 0.8 mole of potassium chloride and about 0.2 mole of sodium chloride.

ROBERT M. THOMAS.

References Cited in the file of this patent

UNITED STATES PATENTS

| Number | Name | Date |
|---|---|---|
| 2,417,068 | Farlow et al. | Mar. 11, 1947 |
| 2,454,308 | Davis et al. | Nov. 23, 1948 |
| 2,476,771 | Salzberg | July 19, 1949 |
| 2,526,676 | Lovett | Oct. 24, 1950 |

OTHER REFERENCES

Matthews, P. B. No. 47,715, British Intelligence Objectives Sub-Committee, pp. 1-2 (1948).

Hasehe et al., Fiat Final Report No. 836, pp. 1-9 (1946).